｢United States Patent [19]

Reddaway

[11] 3,899,192
[45] Aug. 12, 1975

[54] SPLASH AND SPRAY REDUCING DEVICE FOR A VEHICLE

[76] Inventor: Walter W. Reddaway, 405 Ogden Dr., Oregon City, Oreg. 97045

[22] Filed: Apr. 19, 1974

[21] Appl. No.: 462,370

[52] U.S. Cl. .................................. 280/154.5 R
[51] Int. Cl.² .................................. B62D 25/16
[58] Field of Search ............. 280/154.5 R, 156, 157, 280/154.5 A; 298/1 SG

[56] References Cited
UNITED STATES PATENTS

| | | | |
|---|---|---|---|
| 1,774,242 | 8/1930 | Schneider | 280/157 |
| 3,341,222 | 9/1967 | Roberts | 280/154.5 R |
| 3,521,903 | 7/1970 | Rister | 280/154.5 R |
| 3,632,137 | 1/1972 | Jossy | 280/154.5 R |

FOREIGN PATENTS OR APPLICATIONS 1,101,143  1/1968  United Kingdom ......... 280/154.5 R Primary Examiner—David Schonberg
Assistant Examiner—Michael J. Forman
Attorney, Agent, or Firm—Kolisch, Hartwell, Dickinson & Stuart

[57] ABSTRACT

A device for reducing the spray and splash of fluid thrown from the wheels of a moving vehicle including a mat adapted to capture fluid thrown from the wheels, coalesce the fluid, and drain it back onto the roadway surface. The mat includes a backing section having a surface expanse facing the wheel and a plurality of elongate, resilient blade elements distributed over the surface expanse. The blade elements are secured at one set of their ends to the backing and project outwardly therefrom generally in the direction of the wheel in random, angular, crossing relationship to each other to present a tangled mass of such elements covering the expanse.

16 Claims, 5 Drawing Figures

PATENTED AUG 12 1975   3,899,192
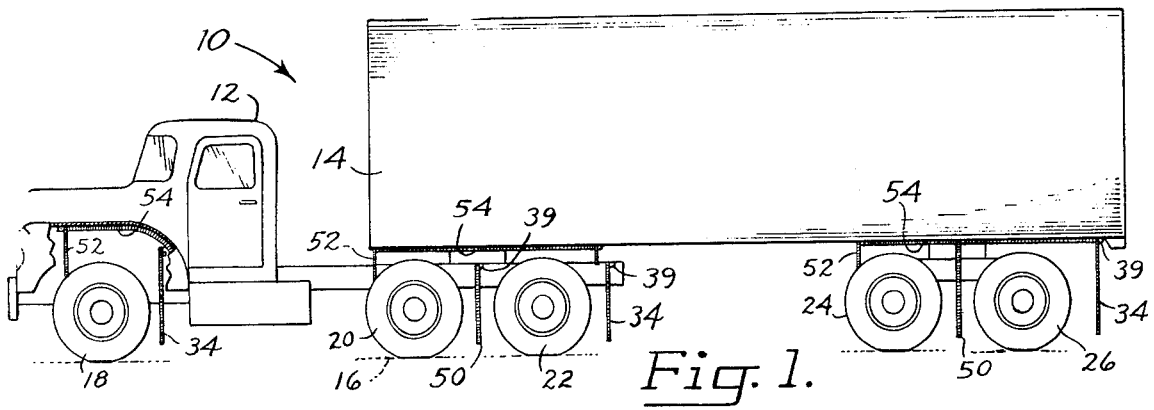
Fig. 1.
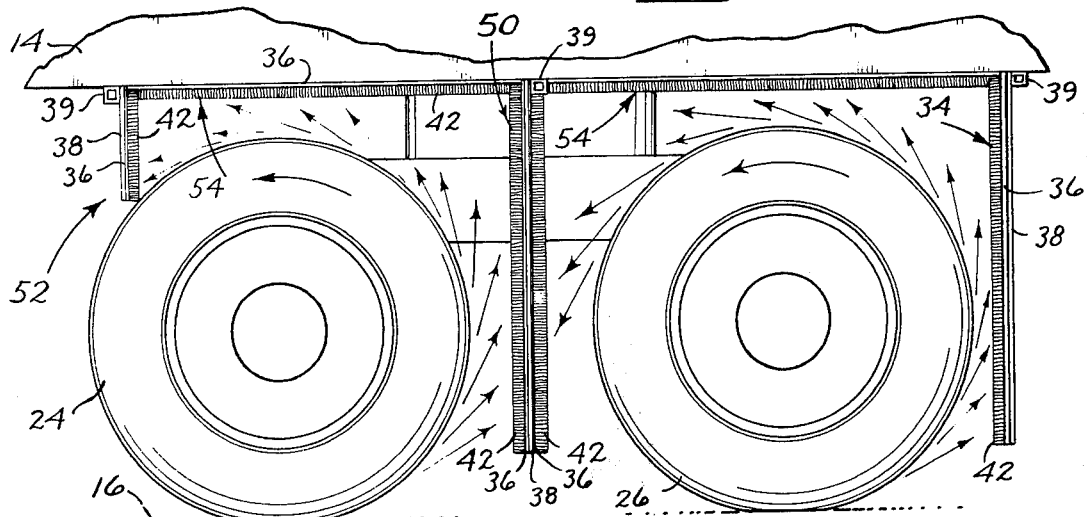
Fig. 3.
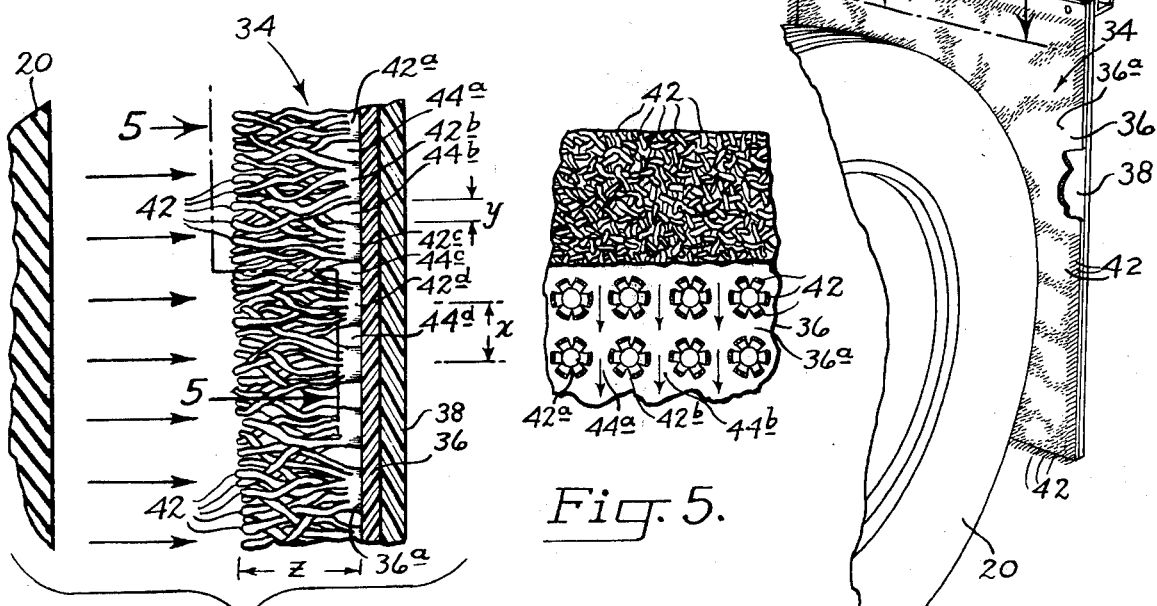
Fig. 4.
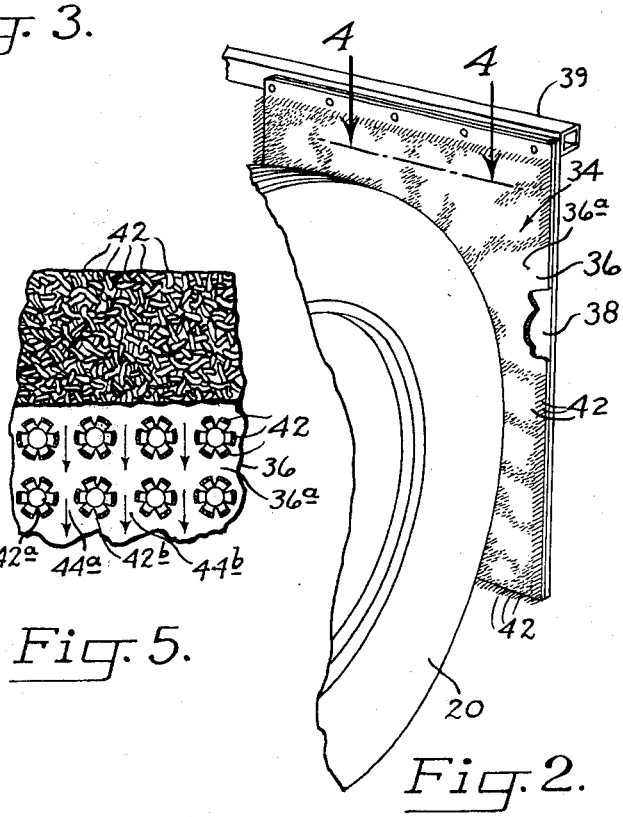
Fig. 5.
Fig. 2.

SPLASH AND SPRAY REDUCING DEVICE FOR A VEHICLE

BACKGROUND AND SUMMARY OF THE INVENTION

This invention relates to a device for reducing the splash or spray of fluids emanating from a moving vehicle.

As a vehicle, such as a large truck, travels on a wet roadway surface, its wheels pick up fluid from the underlying roadway and such fluid is thrown out in the form of a splash, or spray. When this fluid stream is thrown against a solid surface on the truck, or appendage to the truck, it is, in effect, atomized and deflected outwardly as spray. such roadway fluid may be either rainwater, slush from snow, powdered snow, and various degrees of mud and a mixture of the above.

Generally, such fluids are picked up by the rotating wheels of the vehicle and are thrown therefrom by centrifugal force. As the fluid strikes solid surfaces on the vehicle it is reduced (atomized) to a spray which is caught by turbulent air conditions surrounding the vehicle and is thrown in various directions to produce an annoying or dangerous condition to following or adjacent vehicles. Not only is such splash and spray emanating from a moving vehicle annoying to following and adjacent vehicles, but it also may be dangerous, in that it impedes the vision of the drivers of following or adjacent vehicles and can produce accidents.

The problem of splash and spray emanating from moving vehicles has become more apparent in recent years because traveling speeds of vehicles are progressively increasing, and the amount of splash and spray produced by a vehicle increases dramatically as the speed of the vehicle increases. Further, recent roadway designs have been such that they do not drain fluids as readily as previous roadway designs, and thus, additional fluids are maintained on the roadway surfaces to be picked up by vehicle wheels and produce splash and spray.

In the past, various devices have been tried in an attempt to reduce such splash and spray. Probably most common are the use of conventional mudflaps which hang behind the wheels of a vehicle and have a hard planar surface facing the wheel. These have been found to be less than satisfactory in that generally they merely provide another solid surface against which fluid may be thrown at high speeds, atomized, and carried into the turbulent air flow surrounding the vehicle.

Various styles of fenders and wheel skirts have been attempted, but none have proved altogether satisfactory. Not only do such fenders, or skirts, provide additional solid surfaces against which fluid may be thrown to break it into smaller particles and produce a spray for mixing with turbulent air masses, but if such skirts are extended downwardly sufficiently over the sides of the wheels to prevent spray and splash, they produce difficulty in installing and removing tire chains and tires. They further have the serious disadvantage of producing excessive brake and tire temperatures when a substantial portion of the wheel well is enclosed.

A general object of the present invention is to provide a novel device for reducing the splash and spray of fluid from a moving vehicle, which device is simple and economical in construction, and which takes care of the above-identified failings and disadvantages of prior devices.

More specifically, an object of the invention is to provide such a splash and spray reducing device which includes a backing having a surface expanse facing generally in the direction of the wheel, and elongate blade-like elements distributed over the surface expanse of the backing and extending generally in the direction of the wheel. The blade-like elements project outwardly toward the wheel in random angular relation to each other and to the surface expanse, crossing each other to define a tangled mass covering the surface. Such blade-like elements are operable to catch fluid thrown from the wheels, coalesce it into a fluid mass, and allow such fluid mass to drain back on to the roadway.

Another object is to provide such a device which may be positioned behind, above, and/or in front of a rotating wheel to capture fluid thrown centrifugally from the wheel, coalesce the fluid, and allow it to drain harmlessly back onto the roadway surface, rather than allowing it to fly freely into the turbulent air pattern surrounding the vehicle.

Yet another object of the invention is to provide such a novel device in which the ends of the blade-like elements secured to the backing surface are disposed in laterally spaced rows and define fluid flow channels therebetween, with portions of the elements spaced outwardly from the expanse crossing each other in randomly angularly disposed relationship to overlie the fluid flow channels. With such construction the blade-like elements are adapted to capture fluid sprayed from the wheels of the vehicle, with the fluid then coalescing and passing into the fluid flow channels and draining therethrough toward the roadway surface.

DRAWINGS

These and other objects and advantages will become more fully apparent as the following description is read in conjunction with the drawings, wherein:

FIG. 1 is a side elevation view of a truck on which spray-reducing devices according to an embodiment of the invention have been installed;

FIG. 2 is a perspective view of the rear portion of a wheel of the vehicle and a spray-reducing device mounted rearwardly of the wheel;

FIG. 3 is a side elevation view, on an enlarged scale, of a tandem pair of wheels of the truck with spray-reducing devices according to the invention installed adjacent thereto;

FIG. 4 is an enlarged cross-sectional view of a portion of a vehicle wheel and spray-reducing device taken generally along the line 4—4 in FIG. 2; and FIG. 5 is an enlarged view of a portion of a spray-reducing device, taken generally along the line 5—5 in FIG. 4.

DESCRIPTION OF A PREFERRED EMBODIMENT OF THE INVENTION

Referring to the drawings, and first more particularly to FIG. 1, at 10 is indicated generally a truck having a tractor portion 12 and a trailer portion 14 connected to the rear end of the tractor. Tractor 12 is supported for movement over a roadway surface 16 on front wheels 18, and tandem rear wheels 20 and 22. The forward end of trailer 14 is supported on the rear of the tractor and the rear end of the trailer is supported on a tandem pair of wheels 24, 26.

Tractor 12 has fenders, such as that indicated generally at 30, which extend outwardly over steerable front wheels 16 of the tractor. Trailer 14 is of such width as to extend laterally outwardly over the tops of rear wheels 20, 22 on the tractor, and outwardly over wheels 24, 26 supporting the rear end of the trailer.

Indicated generally at 34 are spray-reducing devices according to an embodiment of the invention. Devices 34 are substantially rectangular mats which are suspended vertically rearwardly of and substantially in line with wheels of the truck, much in the same position as a conventional mudflap. In FIG. 1, devices 34 are illustrated suspended behind front wheel 16 of the tractor, and behind rear wheels 22 26 in each tandem pair for the tractor and trailer.

Referring to FIGS. 2, 4, and 5, a device 34 includes a substantially planar, rectangular, sheet-like backing section 36 which may be secured (as by adhesive, rivets, or other fastening means) to a substantially planar, rectangular support member indicated generally at 38. The backing section may be a molded polyethylene sheet with a nylon fabric embedded therein. Support member 38, in turn, is secured along its upper edge, as seen in FIGS. 2 and 3, to a support element 39 secured to the truck. The device thus is suspended vertically behind, and generally aligned with, the rear side of a wheel in the vehicle, much as a conventional mudflap would be. Support member 38 may be constructed of a substantially rigid material, such as a sheet of fiberglass, or have sufficiently rigid supports connected thereto, whereby it would be of a nonsailing type to retain its position behind the wheel throughout operation of the vehicle.

As is best seen in FIGS. 2 and 4, a substantially planar surface expanse 36a of backing section 36 faces in the direction of its associated wheel. A plurality of elongate, resilient, blade-like elements, indicated generally at 42, are distributed over substantially the entire surface expanse 36a of the backing section. Elements 42 are secured at one set of their ends to surface expanse 36a of the backing section and project outwardly therefrom generally in the direction of the wheel. The secured inner ends of elements 42 are disposed generally in laterally spaced rows (as indicated generally at 42a, b, c, d, etc.) extending substantially vertically of the device. The center-to-center spacing, "x," between adjacent rows may be on the order of ¼ inch with the lateral open space between adjacent rows, "y," being on the order of ⅛ inch.

Blade elements 42 are resilient, being made of a material such as molded polyethylene, and on progressing outwardly from their secured inner ends have randomly curved configurations. On progressing outwardly from backing section 36 blade elements 42 are disposed in random angular relationship to each other and to the surface expanse, whereby they cross over and around each other intermediate their inner and outer set of ends. The blade elements are sufficiently closely spaced so that due to their random orientation they present a randomly tangled mass covering the backing expanse. This is illustrated in FIG. 5 where a view is taken from the outer set of ends of the blade elements. The lengths of blade elements 42 preferably would be in a range of from ¼ to 2½ inches and in the embodiment illustrated have a width of about 1/16 inch.

Due to the secured sets of ends of the blade elements being disposed in laterally spaced rows, vertically disposed fluid flow channels, indicated generally at 44a, b, c, d, etc., are defined therebetween adjacent surface expanse 36a. Due to the random orientation, close spacing, and crossing over of blade elements from one row to intertwine with blade elements in an adjacent row the blade elements present a tangled mass overlying the fluid flow channels. An example of a material which has been found to work well for manufacturing such spray-reducing devices is Astroturf produced by Monsanto Company and designated CH—4.

Referring to FIGS. 1 and 3, another embodiment of the invention is indicated generally at 50 suspended vertically between tandem pairs of wheels 20, 22 and 24, 26, respectively. Referring particularly to FIG. 3, device 50 includes a substantially rectangular, planar support member 38 which is supported adjacent its upper end on a support element 39 secured to the truck. As with previously described device 34, a device 50 is mounted substantially in line with its associated wheels and extends over a major portion of the space between the underside of the truck and the underlying roadway, and extends laterally a short distance to opposite sides of the wheels.

In device 50, a pair of backing sections 36 having blade-like elements 42 secured thereto are secured to opposite planar faces of support member 38. Blade elements 42 on one of the backing sections face the forward wheel in the tandem pair, as illustrated by wheel 24, and the blade elements 42 on the other backing section face toward the rear wheel in the tandem pair, as illustrated by wheel 26.

Referring again to FIGS. 1 and 3, at 52 are indicated generally shorter versions of the device of the invention suspended adjacent the forward sides of wheels 18, 20 and 24. In a device 52, support member 38 preferably would be somewhat flexible and backing sections 36 would be secured to the rearwardly facing planar surface of the support member with blade elements 42 projecting rearwardly therefrom. As is best seen in FIG. 3, the lower end of a device 52 may rest in lightly contacting relationship with the periphery of its associated wheel.

Referring still to FIGS. 1 and 3, at 54 are illustrated spray-reducing devices secured to the underside of the trailer and the underside of fender 30 where such overlies a wheel. In this embodiment, backing section 36 is secured either to the underside of the trailer or to the underside of the fender in a position directly above and aligned with the top of the wheel, with blade-like elements 42 directed downwardly toward the wheel.

Describing the operation of the invention, as the vehicle travels on a wet roadway fluid is picked up by the turning wheels and carried upwardly from the surface and is thrown outwardly therefrom by centrifugal force. The spray or splash of fluid emanating from the back side of the wheels is caught, and captured by blade elements 42 on devices 34, 50. As the fluid is captured by the blade-like elements it flows toward the backing section and coalesces into a liquid mass which then drains downwardly between the inner, or secured, sets of ends of the elements and drains back onto the roadway surface. The randomly oriented tangled mass of blade elements thus captures the fluid, preventing it from being atomized and picked up by turbulent air currents which otherwise would spray it out into the regions following and adjacent the vehicle.

Fluids carried further along the periphery of the rotating wheel are thrown against the blade elements 42 on devices 54 under the fenders and undersides of the trailer or onto the rearwardly facing blade elements 42 on devices 50, 52. Each of these acts, as did the forwardly directed blade-like elements on devices 34 to capture, coalesce and drain the fluid harmlessly onto the roadway surface, rather than allowing it to atomize and be caught up in the turbulent air masses surrounding the vehicle.

An added advantage of the particular construction described herein, is that the same is easily cleaned of snow, mud, or other foreign material which might collect in the blade elements. It has been found that the devices often will be cleaned of such foreign materials by the splash of fluid thrown thereagainst by the wheel.

While specific embodiments of the invention have been disclosed herein, it should be apparent to those skilled in the art that variations and modifications are possible without departing from the spirit of the invention.

It is claimed and desired to be secured by Letters Patent:

1. A device for reducing splash and spray of fluid thrown from the wheels of a vehicle comprising
   a backing section mounted on such vehicle having a surface expanse facing the periphery of the wheel and
   a plurality of elongate elements distributed over a major portion of said expanse and secured at an inner set of their ends to said backing with said inner ends of the elements disposed in laterally spaced rows and remainder portions of said elements projecting outwardly generally in the direction of said wheel in random angular relations to each other and to said surface expanse, with portions of said elements spaced outwardly from said backing disposed in a random tangled mass.

2. The device of claim 1, wherein an element comprises a resilient, elongate blade.

3. The device of claim 2, wherein said blades are randomly curved intermediate their inner and outer sets of ends.

4. A device for reducing splash and spray of fluids thrown from the wheels of a moving vehicle, said device comprising a backing section having a surface expanse which may be supported on the vehicle with said expanse facing the periphery of the wheel, and a plurality of elongate elements distributed over a major portion of said surface expanse and secured at one set of their ends to said backing, said elements projecting outwardly from said expanse generally in the direction of the wheel in random angular relation to each other and to said surface expanse, whereby portions of said elements intermediate their opposite sets of ends and spaced outwardly from said expanse cross each other at random angles and means for mounting said device on said vehicle adjacent said wheels.

5. The device of claim 4, wherein the secured set of ends of said elongate elements are disposed in laterally spaced rows and define fluid flow channels therebetween adjacent said expanse.

6. The device of claim 5, wherein portions of said elements spaced outwardly from said expanse cross over said fluid flow channels at random angles to each other.

7. The device of claim 6, wherein said portions of said elements spaced outwardly from said expanse are sufficiently closely spaced and randomly oriented as to present a tangled mass of elements covering said expanse.

8. The device of claim 4, wherein said elements may range in length from ¼ inch to 2½ inches.

9. The device of claim 4, wherein said elements comprise elongate resilient blades which are randomly curved intermediate their opposite sets of ends.

10. In combination with a wheeled vehicle a device for reducing splash and spray of fluid from the wheels of said vehicle comprising a mat supported on said vehicle adjacent a wheel in a position to catch fluid emanating from the wheel when the vehicle is moving, said mat including a backing section having a surface expanse facing the periphery of the wheel, and a plurality of elongate elements distributed over a major portion of said surface expanse and secured at one set of their ends to said backing, said elements projecting outwardly from said expanse generally in the direction of the wheel in random angular relationship to each other and to said surface expanse, whereby portions of said elements spaced outwardly from said expanse cross each other at random angles to present a tangled mass of elements covering said expanse.

11. The device of claim 10, wherein the secured set of ends of said elongate elements are disposed in laterally spaced rows and define fluid flow channels therebetween adjacent said expanse.

12. The combination of claim 10, wherein said elements comprise elongate resilient blades.

13. The combination of claim 12, wherein said blades are randomly curved intermediate their oppposite sets of ends.

14. The combination of claim 10, which further comprises means mounting said device adjacent the rear side of a wheel with said expanse and elements directed toward said wheel operable to catch fluid thrown rearwardly from said wheel.

15. The combination of claim 10, which further comprises means mounting said device adjacent the front of a wheel with said expanse and elements directed toward said wheel operable to catch fluid thrown forwardly relative to the vehicle from said wheel.

16. The combination of claim 10, which further comprises means mounting said device above a wheel with said expanse and said elements directed downwardly toward said wheel operable to catch fluid thrown upwardly from said wheel.

* * * * *